United States Patent
Xu et al.

(10) Patent No.: US 11,467,543 B2
(45) Date of Patent: Oct. 11, 2022

(54) PROCESS CONTROLLER DESIGN WITH PROCESS APPROXIMATION AND LAMBDA TUNING

(71) Applicant: FISHER-ROSEMOUNT SYSTEMS, INC., Round Rock, TX (US)

(72) Inventors: Shu Xu, Austin, TX (US); Mark J. Nixon, Round Rock, TX (US); James Beall, Bryan, TX (US); Terrence L. Blevins, Round Rock, TX (US); Todd Maras, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 16/577,718

(22) Filed: Sep. 20, 2019

(65) Prior Publication Data

US 2021/0088982 A1   Mar. 25, 2021

(51) Int. Cl.
| G05B 11/32 | (2006.01) |
| G05B 11/14 | (2006.01) |
| G05B 11/42 | (2006.01) |

(52) U.S. Cl.
CPC .............. *G05B 11/42* (2013.01); *G05B 11/14* (2013.01); *G05B 11/32* (2013.01)

(58) Field of Classification Search
CPC .......... G05B 11/42; G05B 11/14; G05B 11/32
See application file for complete search history.

(56) References Cited

U.S. PATENT DOCUMENTS

| 2007/0150079 A1* | 6/2007 | Blevins .............. G05B 23/0251 700/41 |
| 2009/0138102 A1* | 5/2009 | Moden ................. G05B 13/048 700/37 |

(Continued)

FOREIGN PATENT DOCUMENTS

| GB | 2 353 608 A | 2/2001 |
| GB | 2 545 057 A | 6/2017 |

OTHER PUBLICATIONS

Jim Cahill, Lambda Tuning—Yeah or Neah?, May 23, 2012, Emerson Automation Experts Blog https://www.emersonautomationexperts.com/2012/services-consulting-training/lambda-tuning-yeah-or-neah/ (Year: 2012).*

(Continued)

*Primary Examiner* — Kenneth M Lo
*Assistant Examiner* — Tameem D Siddiquee
(74) *Attorney, Agent, or Firm* — Marshall, Gerstein & Borun LLP

(57) ABSTRACT

A method for designing and tuning a PID process controller includes approximating a process as a second order process but in a manner that includes the effects or characteristics introduced by various different devices in the I/O network, and using a lambda tuning method to determine tuning parameters or coefficients for the PID controller. The enhanced controller design and tuning method provides a systematic manner of achieving performance improvement of PID controllers within a process control system and is effective at overcoming challenges arising from signal aliasing, the use of anti-aliasing filtering and the effects of different I/O settings of both traditional and advanced I/O marshalling architectures.

46 Claims, 4 Drawing Sheets

(56) References Cited

U.S. PATENT DOCUMENTS

| | | | | |
|---|---|---|---|---|
| 2009/0198350 A1* | 8/2009 | Thiele | ............... | G05B 17/02 |
| | | | | 700/30 |
| 2009/0319060 A1* | 12/2009 | Wojsznis | ............... | G05B 17/02 |
| | | | | 700/30 |
| 2013/0079901 A1* | 3/2013 | Blevins | ............... | G05B 21/02 |
| | | | | 700/71 |
| 2014/0249653 A1* | 9/2014 | Blevins | ............... | G05B 19/058 |
| | | | | 700/21 |
| 2014/0249654 A1 | 9/2014 | Blevins et al. | | |
| 2015/0162849 A1* | 6/2015 | Kurokawa | ............... | H02M 1/08 |
| | | | | 363/78 |
| 2019/0187631 A1* | 6/2019 | Badgwell | ............... | G05B 11/011 |
| 2019/0227505 A1 | 7/2019 | Burgwinkel | | |

OTHER PUBLICATIONS

Skogestad, "Simple Analytic Rules for Model Reduction and PID Controller Tuning." *Journal of Process Control*, 13:291-309 (2003).
Search Report for Application No. GB2014045.5, dated Apr. 16, 2021.

\* cited by examiner

PROCESS CONTROLLER DESIGN WITH PROCESS APPROXIMATION AND LAMBDA TUNING

TECHNICAL FIELD

The present invention relates generally to process control systems and, more particularly, to the enhanced proportional-integral-derivative (PID) controller design that uses an advanced process approximation method and lambda tuning.

BACKGROUND

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV® system sold by Emerson Automation Solutions use function blocks or groups of function blocks referred to as modules located in the controller or in different field devices to perform control operations. In these cases, the process controller or other device is capable of including and executing one or more function blocks or modules, each of which receives inputs from and/or provides outputs to other function blocks (either within the same device or within different devices), and performs some process operation, such as measuring or detecting a process parameter, controlling a device, or performing a control operation, such as the implementation of a proportional-integral-derivative (PID) control routine. The different function blocks and modules within a process control system are generally configured to communicate with each other (e.g., over a bus) to form one or more process control loops.

Moreover, process controllers are typically programmed to execute a different algorithm, sub-routine or control loop (which are all control routines or control modules) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and one or more output blocks, such as an analog output (AO) function block. Control routines, and the function blocks that implement such routines, have been configured in accordance with a number of known control techniques, including PID control, fuzzy logic control, and model-based techniques such as a Smith Predictor or model predictive control (MPC).

To support the execution of the control routines, a typical industrial or process plant has a centralized control room communicatively connected with one or more distributed process controllers and process I/O subsystems, which, in turn, are connected to one or more field devices. Traditionally, analog field devices have been connected to the process controller by two-wire or four-wire current loops for both signal transmission and the supply of power. An analog field device that transmits a signal to a controller (e.g., a sensor or transmitter) modulates the current running through the current loop, such that the current is proportional to the sensed process variable. On the other hand, analog field devices that perform an action under control of a control routine or control module is controlled by the magnitude of the current through the loop.

Some field devices have been configured to superimpose digital data on the current loop used to transmit the analog signals. For example, the Highway Addressable Remote Transducer (HART®) protocol uses the loop current magnitude to send and receive analog signals, but also superimposes a digital carrier signal on the current loop signal to enable two-way field communication with smart field instruments. Another protocol generally referred to as the FOUNDATION® Fieldbus protocol defines completely digital protocols supporting different data transfer rates while powering field devices coupled to the network. With these types of communication protocols, smart field devices, which are typically all digital in nature, support a number of maintenance modes and enhanced functions not provided by older control systems.

With the increased amount of data transfer between field devices and process controllers, one particularly important aspect of process control system design involves the manner in which field devices are communicatively coupled to each other, to the process controllers and to other systems or devices within a process control system or a process plant. In general, the various communication channels, links and paths that enable the field devices to function within the process control system are commonly collectively referred to as an input/output (I/O) communication network.

The I/O communication network topology and physical connections or paths used to implement an I/O communication network can have a substantial impact on the robustness or integrity of field device communications, particularly when the network is subjected to adverse environmental factors or harsh conditions. These factors and conditions can compromise the integrity of communications between one or more field devices and the controller. The communications between the controllers and the field devices are especially sensitive to any such disruptions, inasmuch as the control routines typically require periodic updates of the process variables for each iteration of the control routine. Compromised control communications could therefore result in reduced process control system efficiency and/or profitability, and excessive wear or damage to equipment, as well as any number of potentially harmful failures.

In the interest of assuring robust communications, I/O communication networks used in process control systems have historically been hardwired. Unfortunately, hardwired networks introduce a number of complexities, challenges and limitations. For example, the quality of hardwired networks may degrade over time. Moreover, hardwired I/O communication networks are typically expensive to install, particularly in cases where the I/O communication network is associated with a large industrial plant or facility distributed over a large area, for example, an oil refinery or chemical plant consuming several acres of land. Installation of the requisite long wiring runs typically involves substantial amounts of labor, material and expense, and may introduce signal degradation arising from wiring impedances and electromagnetic interference. For these and other reasons, hardwired I/O communication networks are generally difficult to reconfigure, modify or update.

More recently, wireless I/O communication networks have been introduced to alleviate some of the difficulties associated with hardwired I/O networks. Thus, for example, the WirelessHART® communication protocol has been developed for and is in use to preform wireless communications between process controllers and field devices. These wireless networks tend to be different from, and in some ways, more complex than the hardwired I/O communication network. In some instances, an I/O communication network can include both hardwired and wireless components.

Importantly, modern process control requires reliable data communication between the controller and the field devices to achieve optimum control levels. In fact, typical process controllers execute control algorithms at fast rates to be able to quickly correct for unwanted deviations in the process or to respond to set point changes. Unfortunately, environmental factors or other conditions may create intermittent interferences that impede or prevent the fast communications necessary to support such execution of control algorithms. Still further, with the additional complexity of modern I/O networks, these I/O networks can introduce time delays, jitter, and noise into data communications within a process control loop. For example, many field devices or I/O networks include anti-aliasing filters, such as low pass filters, to reduce high frequency noise and cross talk (aliasing) within the communication networks. However, such filters also introduce time delays in the communications. Still further, the use of more complex input/output devices within the I/O communication network, such as I/O devices that perform communication protocol conversion, A/D conversion, wireless to wired communication conversion, etc., also introduce time delays. Additionally, digital communication components in the I/O networks may update their values or transmit data in the network at various different scan rates, and so may introduce further time delays and jitter within the data communications.

There are many different types of process control routines that can be used in a plant to control different process variables and equipment, including proportional-integral-derivative (PID) controllers (which also generally include the sub-categories of proportional (P) controllers, proportion-derivative (PD) controllers and proportional-integral (PI) controllers), model based process controllers, fuzzy logic controllers, etc. However, in real chemical plants, PID controllers account for about 98 percent of industrial control applications. In theory, PID controllers are versatile and robust because they can be tuned or re-tuned during operation of the process. Tuning a PID controller generally involves determining a set of tuning factors, generally including a gain for the proportional controller component, and a time constant (a reset and a rate) for each of the integral and derivative controller components. The combination of these tuning factors affects or determines the response characteristics of the PID controller and, of course, the optimal set of tuning factors is very dependent on the process dynamics and the desired response characteristics (e.g., desired response time) of the process control loop.

Tuning a PID process controller can be a bit complicated or hard to implement optimally in a lot of process control loops, and thus it is very common for many if not all of the PID controllers within a typical chemical plant to be underperforming (not optimally tuned) most of the time. In particular, the quality of the PID control (and the tuning of the PID controllers) is affected by numerous factors including the types of input/output connections or networks used in the plant, the scan rates used in the input/output networks of the plant, the process control module execution rates, noise aliasing and time delays present in the process. In addition, the tradeoffs between high performance (i.e., rapid and smooth set point tracking and disturbance rejection) and robustness (i.e., applicable to a wide range of process conditions) further complicates the tuning of PID controllers leading to the situation in which a lot of PID controllers can easily become detuned and so do not perform at an optimum level. In fact, in many cases, operators will manually tune one of the PID tuning factors (e.g., the controller gain) in response to changes in the process or load disturbances, resulting in a detuned or non-optimally tuned controller. Such underperforming process controllers can lead to significant process variabilities, low production efficiencies and production rates, and high energy costs.

As noted above, optimal tuning of a PID process controller is dependent on the process dynamics. However, because of the communication factors described above, the dynamics of real industrial processes are complex and often are best described by higher-order-plus-time-delay transfer functions. As a result, it is difficult to mathematically select the optimally tuning parameters for a PID controller based on an original process transfer function that is more than a second order transfer function.

Still further, other process controller and input/output network design parameters affect the proper tuning of a PID controller. In particular, the various sampling rates used in the input/output network and the process controller execution rate can be significant factors in tuning a process controller (as these factors result in higher order effects in the process transfer function). Thus, for example, because digital computers are commonly used in plant control, continuous measurements are converted into digital form by an analog-to-digital converter (ADC), and these continuous measurements may be sampled by scanners or measurement devices at different rates. Still further, as noted above, these measurements are transmitted between various different devices within the I/O communication network, generally including transmissions between a measurement device and one or more input/output (I/O) marshalling devices, and between the I/O marshalling devices and a process controller. Still further, controller outputs or control signals used to affect devices in the plant (e.g., open and close valves, move actuators, etc.) are transmitted from the process controller to the field devices that implement the control action via one or more other I/O marshalling devices and I/O network communication paths. The I/O marshalling devices can include multiple different devices that each perform some function, such as converting signals from one protocol to another protocol, converting digital signals to analog signals or vice versa, performing as a gateway between a wired and a wireless network or signal path, etc. Each of these links in the I/O network can also use a different scan rate and so generally introduce signaling delays in the performance of the process control loop. Likewise, some I/O devices include switchable filters, such as high pass or low pass filters, to decrease signal interference (cross talk) or to improve other communication characteristics. However, such filters can introduce further signaling delays (and thus introduce higher order effects in the process network transfer function). Such delays (and higher order effects) operate to degrade the stability and damping of the process control system or loop, especially when the controller scan or execution rates are low. Generally speaking, these delays and other characteristics are not able to be accounted for when designing or tuning a typical process control loop.

SUMMARY

A method for designing and tuning a PID process controller includes approximating a process as a second order process but in a manner that includes the effects or characteristics introduced by various different devices in the I/O network, and using a tuning method, such as a lambda tuning method, to determine tuning parameters or coefficients for the PID controller. The enhanced controller design and tuning method provides a systematic manner of achieving performance improvement of PID controllers within a process control system and is effective at overcoming challenges arising from signal aliasing, the use of anti-aliasing filtering and the effects of different I/O settings of both traditional and advanced I/O marshalling architectures.

More particularly, the controller design and tuning method first approximates an industrial process based on a "half-rule" approximation method which approximates a process using a dead time plus second order time constant approximation but that also includes the time delays (or time constants) and scanning rates of various different I/O devices within the process control loop, and then designs a lambda tuning rule based on the resulting approximated system. Importantly, the process approximation method accounts for various higher order time delays, such as those injected into the system by various different I/O marshalling devices and communication networks, the use of anti-aliasing filters, and the use of different scan and different execution rates by the I/O network components and the process controller, by including the time delays associated with these components into the dead time approximation and into the computation of the first and second time constants of the second order process approximation. This controller design and tuning method enables a PID process controller to be tuned optimally even in the presence of these various different higher order effects of the process and I/O communication network used to perform PID control, thus leading to better, more efficient and more robust control in a PID control network.

In one embodiment, a method of tuning a proportional-integral-derivative (PID) process controller for use in controlling a process when the PID process controller is connected to the process via an input/output network, wherein the PID process controller, the input/output network and the process form a process loop, includes determining one or more characteristics of the PID process controller by determining an execution rate of the PID process controller and determining one or more characteristics of the process by determining one or more time constants of the process and one or more process dead times of the process. The method also includes determining one or more characteristics of one or more devices within the input/output network of the process loop, including determining at least one of one or more input/output device scan rates and one or more input/output time constants associated with the one or more devices within the input/output network of the process loop and one or more input/output dead times associated with the one or more devices within the input/output network. The method then estimates the process control loop as a second order plus dead time estimated process by determining first and second order time constants of the estimated process as a function of the one or more process time constants and the one or more input/output time constants and determining the dead time of the estimated process as a function of the one or more dead times of the process, the one or more process time constants, the one or more input/output time constants, the one or more input/output device scan rates, the execution rate of the PID process controller and the one or more input/output dead times. Still further, the method determines a set of PID process controller tuning factors from the estimated process time constants and the estimated process dead time and then tunes the PID controller using the determined set of PID process controller tuning factors.

DETAILED DESCRIPTION

Figure 1:
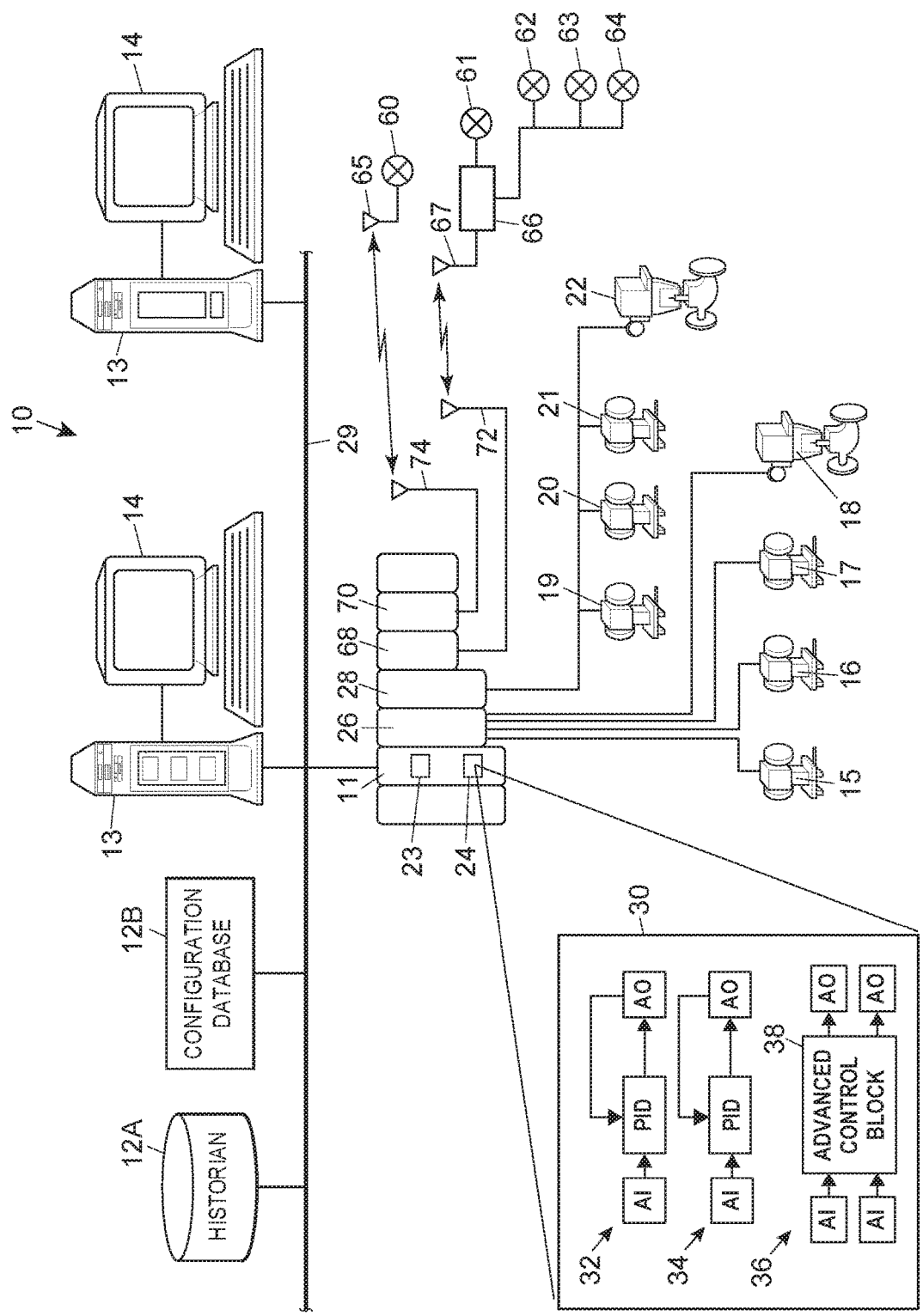
FIG. 1 is a schematic representation of a process control system having a controller configured to implement one or more control routines utilizing a controller design and tuning process described herein.

FIG. 1 illustrates a process control system 10 that may be used to implement a new PID controller design and tuning methodology as described in detail herein. The process control system 10 includes a process controller 11 connected to a data historian 12A, to a configuration database 12B and to one or more host workstations or computers 13 (which may be any type of personal computers, workstations, etc.), each having a display screen 14. The process controller 11 is also connected to field devices 15-22 via input/output (I/O) cards 26 and 28 and to a set of wireless field devices 60-66 via input/output cards 68 and 70 and wireless transmitters/antennas 72 and 74. The data historian 12 may be any desired type of data collection unit having any desired type of memory and any desired or known software, hardware or firmware for storing data. The data historian 12 may be separate from (as illustrated in FIG. 1) or a part of one of the workstations 13. Still further, the configuration database 12B may store configuration data about the process control system 10 and the components thereof, including information pertaining to the devices (e.g., controllers and field devices) within the process control system 10, the software or firmware stored within and executed within the devices of the process control system 10, the settings or configuration parameters of those devices and software or firmware components, the control modules executed within the controllers of the process control system 10, the identity of various control loops within the process control system 10, etc.

The controller 11, which may be, by way of example, the DeltaV controller sold by Emerson Automation Solutions, is communicatively connected to the host computers 13, to the data historian 12A and to the configuration database 12B via, for example, an Ethernet bus or communication connection 29 or any other desired communication network. The controller 11 is also communicatively connected to the field devices 15-22 using either a hardwired or wireless communication scheme, as described further herein. In either case, any desired hardware, software and firmware may be utilized to implement the control schemes of the controller 11, which may associated with, for example, standard 4-20 ma devices (when hardwired) and/or any smart communication protocol such as the FOUNDATION® Fieldbus protocol, the HART® protocol, the Profibus protocol, the CAN protocol, etc. In the exemplary embodiment shown in FIG. 1, communications between the controller 11 and the field devices 15-22 involve hardwired connections but could instead or additionally include wireless communication connections, such as those implemented using the WirelessHART® communication protocol.

More generally, the field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 ma devices or HART devices that communicate over analog lines or combined analog and digital lines to the I/O card 26, while the field devices 19-22 are smart devices, such as Fieldbus field devices, that communicate over a digital bus to the I/O card 28 using Fieldbus protocol communications. Of course, the field devices 15-22 may conform to any other desired standard(s) or protocols, including any standards or protocols developed in the future.

Still further, the wireless field devices 60-67 are disposed within the process control system 10 to perform control functions therein, and communicate with the process controller 11 using, at least partially, wireless communications that may conform to any desired protocol, such as the WirelessHART® communication protocol. In the example of FIG. 1, the input/output devices 68 and 70 may be communicatively coupled to the controller 11 and to the set of wireless field devices 60-64, which are illustrated as transmitters (e.g., measurement field devices), via transmitter/receivers 65, 67, 70 and 74. In this example, the module or device 66 may be a wireless router that collectively handles wireless communications for the transmitters 61-64 while the transmitter 60 is a standalone field device having its own antenna 65. In some cases, the transmitters 60-64 may constitute the sole link between the process sensors and the control room and, as such, may be relied upon to send accurate signals to the control network to ensure that product quality and flow are not compromised. Thus, the transmitters 60-64, often referred to as process variable transmitters (PVTs), may play a significant role in the process control system 10.

As will be understood, each of the transmitters 60-64 or other field devices transmits a process signal indicative of a respective process variable (e.g., a flow, pressure, temperature or level) to the controller 11 for use in one or more control loops or routines. However, in some cases, the transmitters 60-64 could receive control signals from the controller 11 to perform some control action in the process. Generally speaking, the controller 11 may include a number of elements directed to supporting the wireless communication and, specifically, reception, of the process signals. The elements may include or constitute, for example, software routines stored in a memory 24 or hardware or firmware resident elsewhere in the controller 11. In any case, the manner in which the wireless communications are received (e.g., demodulated, decoded, etc.) may take any desired form, and will only be generally addressed herein.

As shown in FIG. 1, the controller 11 includes a processor 23 that implements or oversees one or more process control routines (or any module, block, or sub-routine thereof) stored in a memory 24. The process control routines stored in the memory 24 may include or be associated with control loops being implemented within the process control system 10. Generally speaking, the controller 11 communicates with the devices 15-22 and 60-64, the host computers 13, the data historian 12A and the configuration database 12B to control a process in any desired manner. It should be noted that any control routines or modules described herein may have parts thereof implemented or executed by different controllers or other devices if so desired. Likewise, the control routines or modules described herein to be implemented within the process control system 10 may take any form, including software, firmware, hardware, etc. For the purpose of this discussion, a control module may be any part or portion of a process control system including, for example, a routine, a block or any element thereof, stored on any computer readable medium. Control routines, which may be modules or any part of a control procedure such as a subroutine, parts of a subroutine (such as lines of code), etc., may be implemented in any desired software format, such as using object oriented programming, ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner. Likewise, while only one process controller 11 is illustrated in FIG. 1, multiple process controllers could be connected to the same or different field devices within the process control system 10 to perform control as described herein.

In some embodiments, the controller 11 implements a control strategy or scheme using what are commonly referred to as function blocks, where each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist and may be utilized herein. The function blocks may be stored in and executed by the controller 11, which is typically the case when the function blocks are used for, or are associated with standard 4-20 ma devices and some types of smart field devices such as HART devices. Alternatively or additionally, the function blocks may be stored in and implemented by the field devices themselves, which may be the case with Fieldbus devices. While the description of the control system 10 is provided herein using a function block control strategy, the disclosed techniques and system may also be implemented or designed using other conventions, such as ladder logic, sequential function charts, etc. or using any other desired programming language or paradigm.

As illustrated by the exploded block 30 of FIG. 1, the controller 11 may include a number of single-loop control routines, illustrated as routines 32 and 34, and, if desired, may implement one or more advanced control loops, illustrated as a control loop 36. Each such loop is typically referred to as a control module. The single-loop control routines 32 and 34 are illustrated as performing single loop control using a single-input/single-output PID control block connected to appropriate analog input (AI) and analog output (AO) function blocks, which may be associated with process control devices such as valves, with measurement devices such as temperature and pressure transmitters, or with any other device within the process control system 10. The PID control blocks may, however use other inputs if so desired and the PID tuning method described herein is not limited to use with AO and AI input/output blocks. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may implement any type of multiple-input, multiple-output control scheme, and may constitute or include a model predictive control (MPC) block, a neural network modeling or control block, a multi-variable fuzzy logic control block, a real-time-optimizer block, etc. It will be understood that the function blocks illustrated in FIG. 1 can be executed by the controller 11 or, alternatively, can be located in and executed by any other processing device, such as one of the workstations 13 or one of the field devices 19-22 or 60-64.

As noted above, current process control systems have a lot of complexities introduced by the changing process dynamics themselves as well as by the use of various different input/output network equipment used to perform control, all of which adds time delays and noise to the process control signals used to perform process control. Such complexities or sources of noise and delay include, for example, the use of analog to digital converters, anti-aliasing filters, and various different input/output configurations that use various different devices in the input/output network chain, the use of different scanning rates by different components in the input/output network, etc. These complexities make it very difficult to tune a PID process control loop optimally based on current tuning techniques, which tend to assume that a process control loop can be described as a simple second-order plus dead time system. As a result, PID control loops may be tuned initially, and may even work somewhat well for a time.

However, as process dynamics change, as process control system devices within a process control loop deteriorate (thereby changing time constants), as new input/output devices are added in a process control loop, as anti-aliasing filters are turned on or off, as scanning rates change, etc., these PID control loops become detuned and non-optimal, leading to reduced performance of and responsiveness by the process controller to system changes (e.g., changes in set points, load disturbance rejection, etc.) For example, a process control loop may take longer than desired to reach a steady state response, longer than desired to reach a new value, may unacceptably overshoot a desired process value, may become overdamped and not reach desired process values, may not react well to load disturbances, etc. In response to this non-optimal operation, a process operator will generally manually adjust the gain of the PID controller to speed up or slow down the controller response, or to change the final resting point of the control signal. This manual tuning, while correcting for a particular process control dynamic, typically places the process control loop in a non-optimal state which reduces the overall process output or quality. This reduction in quality and output is especially true when multiple ones of the process control loops used in a process are non-optimally designed or tuned.

To provide for more optimal tuning of a PID control loop in a process, such as in a chemical process, a new PID process controller design and/or tuning methodology or technique first approximates the industrial process (and the control loop used to control that process) based on a modified form of the so-called "half-rule" process approximation, and designs a tuning rule, such as a lambda tuning rule, based on the resulting approximated system. The PID controller design or tuning method or system then uses the resulting rule to determine the tuning parameters to be used in the PID controller and may provide these tuning parameters to the PID controller for use during operation of the process.

Figure 2:
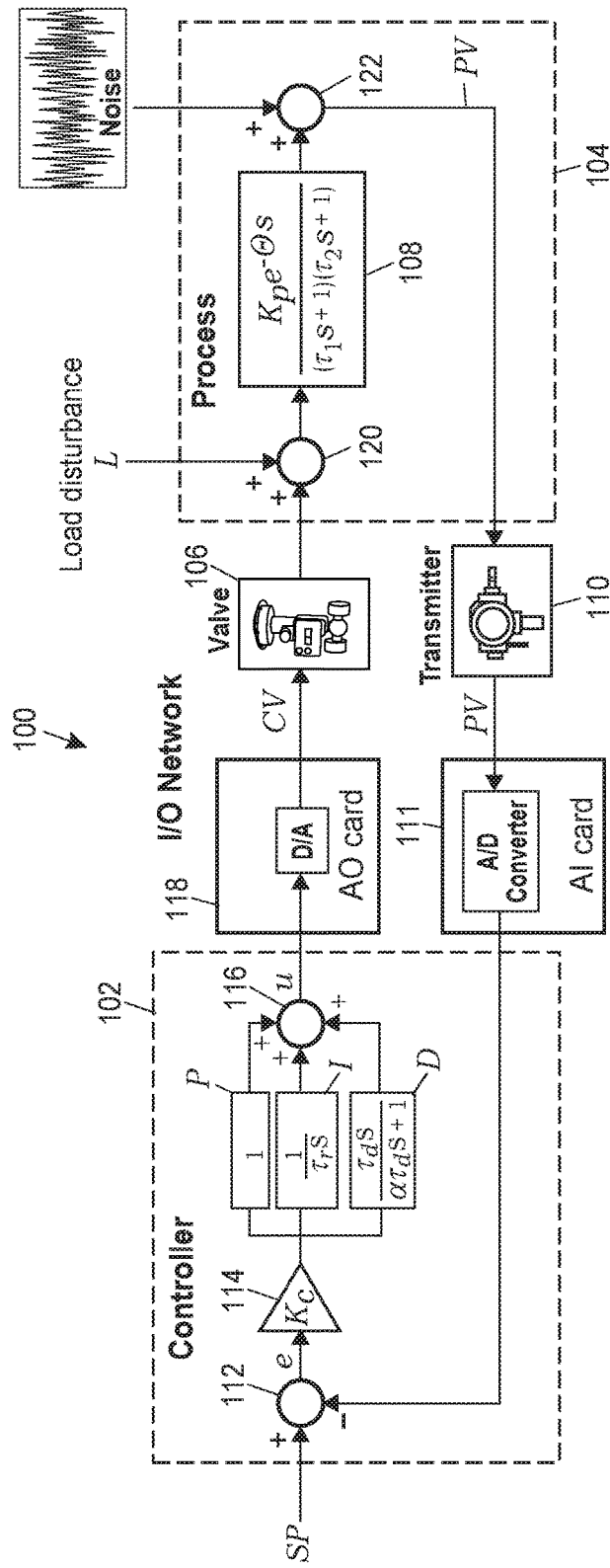
FIG. 2 depicts a representation of a PID process control loop and the various sources of noise and time delays that can be introduced into the control loop.

As better illustrated in FIG. 2, actual industrial processes can be modeled by defining or modeling the separate components thereof. FIG. 2, for example, illustrates a simple process control loop 100 including a PID controller 102 coupled to a process 104 for controlling the process 104. In this case, the PID controller 102 sends a control signal U to a valve 106 to effect a controlled variable (CV), e.g., a valve position, and the change in the controlled variable CV affects the process 104. Generally speaking, the mechanics/chemistry of the process 104 applies a transfer function 108 based on the controlled variable CV to define the value of a process variable (PV) in response to the change of the controlled variable. The process variable PV is measured by a measurement device, illustrated as a transmitter 110, which sends measured process variable PV to the controller 102. Generally, the controller 102 or the control loop includes an AI (analog input) module or card 111 which may be in an input/output card that receives the measured PV (and in some cases that digitizes this signal at a scanning rate to produce a digital version of the measured process variable). The card 11 provides the digital value of the measured process variable to a set point summer 112 that produces an error signal (e) indicative of the error or difference between a set point SP and the feedback measurement of the process variable (PV). The error signal e is provided to a set of PID controller components including a gain unit 114 which multiplies the error signal e by a controller gain ($K_c$) and provides the modified (gained) error signal to each of a proportional (P), integral (I) and derivative (D) controller component. The P, I and D controller components perform processing and, in a general sense, apply a transfer function to the gained error signal to each produce an output component of a control signal, and the outputs of the P, I and D controller components are summed in a summer 116 to produce the control signal U. The control signal U is sent to an AO block or card 118 (in this instance) which may convert the control signal U to an analog signal and sends this signal to the valve 106 to affect or control the operation of the process 104 with respect to the process variable PV being controlled.

As also illustrated in FIG. 2, there are various sources of errors, disturbances and time delays introduced into the process control loop 100. In particular, unmeasured load disturbances L may be introduced as modeled by a summer 120. Noise, e.g., high frequency noise, may be introduced into the process variable PV and is modeled by a summer 122. Likewise, the AI and AO cards 111 and 118, as well as the input/output network, including wiring and other physical layers connecting the controller 102 to the valve 106 and to the transmitter 110, introduce time delays into the process control loop 100. More particularly, the scan rate or sampling rate of the AI and AO cards 111 and 118, the processing time of these cards, the network communication times, etc. introduce time delays into the process control loop 100. In particular, after going through the A/D converter (in the AI card 111 or in the transmitter 110), the process variable (PV) is scanned by an input/output scanner at a user-defined rate before being sent into the I/O network which communicates with the controller 102. For example, with the scanner rate set to be 500 ms, the input/output scanner of the card 111 waits every 500 ms before searching a database to get the PV value updated. Similarly, depending on the scan rate setting, the PID controller 102 may wait every 100/500/ . . . ms before updating the control moves. These same sorts of delays may be introduced by the AO card 118 and the valve 106. These delays may increase if the AI or AO cards 111 and 118 are more complex and are, for example, made up of various devices that must communicate with each other, perform protocol conversions or act as gateways or multiplexers in the I/O network, include or implement anti-aliasing filters, etc.

Still further, the load disturbance L may occur at any time during these potentially different scan periods. Thus, the quality of PID closed loop control can be affected by many factors including the I/O types, I/O scan rates, module execution rates, noise aliasing and time delays introduced by filters and communication path components. Likewise, the process 104 generally has a dead time associated therewith. Still further, if the controller 102 is executed at a slow rate, this controller 102 cannot respond effectively to high frequency noise and disturbances within the process 104.

As noted above, there are many factors that affect the control performance of the controller 102, including noise, aliasing, communication path delays and anti-aliasing filtering. Additionally, there are many sources of process and electrical noise that affect the measurement made by the transmitter 110. For example, if flow is measured using an orifice plate that has been improperly installed, i.e., insufficient straight pipe run upstream, flow turbulence can be a source of process noise that impacts the flow measurement. If electrical power wires are located too close to instrumentation wiring, the 4-20 mA signal carried by the instrumentation wiring can be distorted and seen as noise in the control system. Although aliasing is usually most significant when digitizing analog signals, it can also happen when a digital signal is re-scanned at a slower rate such as when the controller module execution is slower than the I/O scan. As is known, the PID controller only provides effective control on information transmitted below the Nyquist frequency (½ the PID execution rate). On the one hand, electrical noise at a high frequency band may distort the signal below the Nyquist frequency and may lead to corrupted control behaviors. In this case, the PID controller 102 fails to be responsive to some important frequency components in the PV measurement, because the signal is aliased to low frequencies. To prevent the aliasing from 50-60 Hz electrical noise, many traditional analog input cards and other input/output components have built-in anti-aliasing filters. For example, a traditional analog input card includes a two-pole RC filter (−3 dB frequency at around 3 Hz) before the A/D convertor to remove any electrical noise that might be picked up in field wiring. In addition, this hardware filter provides some anti-aliasing protection against process noise if the module using the analog input is configured to execute at 100 ms. Other analog input devices may be designed to remove electrical noise using an FIR filter (−3 dB frequency at around 14.8 Hz) that is integral to the A/D convertor. However, these filters add additional time delays and complexities to the process control dynamics.

Figure 3:
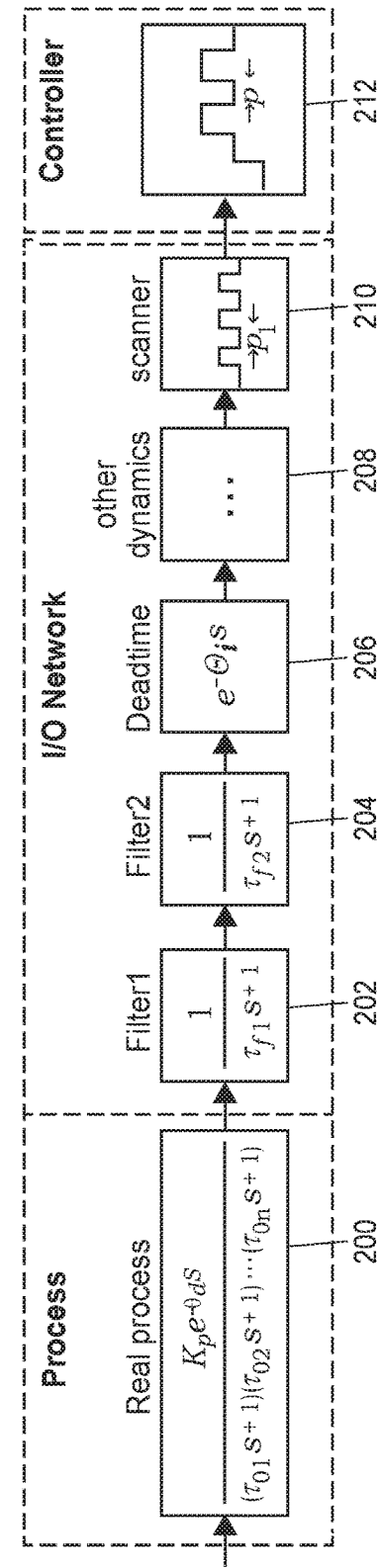
FIG. 3 is a schematic representation of the development of a process control loop model or transfer function based on existence and use of various different elements in the control loop.

In any event, as illustrated in FIG. 3, the process control loop 100 of FIG. 2 can be described or modeled as a series of function blocks, including a high-order plus dead time transfer function (for the process itself), low pass filters transfer functions for the anti-aliasing filters used in the I/O network path, transport delay transfer functions, etc. In the example of FIG. 3, the operation of actual industrial processes and their associated process control networks can be described by a series of interconnected function blocks, including a high-order plus dead time transfer function 200 (for the process itself), low pass filter transfer functions 202 and 204 (for various low pass or anti-aliasing filters disposed in the process control loop), process and communication dead times 206, other process dynamics 208, and transport delays 210 introduced by, for example, the I/O communication network especially by more advanced or complicated input/output networks in use today. Still further, a process controller transfer function 212 affects the operation of the process control loop 100.

As noted above, to perform consistent design and tuning of PID controllers in this environment, a tuning method and system first approximates the process as a second order plus dead time model based on an adaptation of the "half-rule" process approximation proposed by Skogestad, S., "Simple Analytic Rules for Model Reduction and PID Controller Tuning." Journal of Process Control, 13, 291 (2003). In particular, the process ($G_p$) may be estimated as a second order plus dead time process using equation (1) below:

$$G_p = \frac{K_p e^{-\theta_d s}}{(\tau_1 s + 1)(\tau_2 s + 1)} \tag{1}$$

wherein:

$\tau_1 = \tau_{10}; \tau_2 = \tau_{20} + \tau_{30}/2; \theta_d = \Sigma_{i \geq 0} \theta_i + \tau_{30}/2 + \Sigma_{i \geq 4} \tau_{i0} + \Sigma \rho_j/2$.

In another case, the process ($G_p$) may be approximated to include inverse time components, wherein:

$\tau_1 = \tau_{10}; \tau_2 = \tau_{20} + \tau_{30}/2; \theta_d = \Sigma_{i \geq 0} \theta_i + \tau_{30}/2 + \Sigma_{i \geq 4} \tau_{i0} + \Sigma_j T_{j0}^{inv} \Sigma \rho_j/2$.

In both of these cases, the time constant terms $\tau_{i0}$ are the time constants of the various devices in the process control network or loop including the process time constants (time constants associated with the operation of the process itself), the time constants associated with filters or other devices in the input/output marshalling devices, the time constants associated with dynamics of transmitters, valves, actuators, etc. within the process control loop, etc. Additionally, the $\tau_{i0}$ terms are the time constants of the various system components in a descending order (from maximum to the minimum, with $\tau_{10}$ being the largest such time constant, $\tau_{20}$ being the second largest such time constant, etc.) Still further, the $T_{j0}^{inv}$ term denotes the inverse response time constants and the $\rho_i$ terms are the scan rates of the PID process controller, the input/output marshalling devices (the input/output cards or other devices in the I/O network, including, for example, the measurement devices or transmitters, valve input scan rates, etc.), the A/D converters in the input/output devices, etc. Likewise, the $\theta_i$ factors are the dead times of the process control loop, including dead times associated with the transfer function of the process itself, with delays (dead times) introduced by filters and scanning devices within the input/output devices in the input/output loop or structure of the process control loop, etc. For example, a transmitter may introduce a dead time due to a sampling delay or an A/D converter delay or other processing delay, an input/output marshalling device may introduce a dead time due to time delays associated with performing protocol conversions, sampling delays, processing delays, converting for wired to wireless protocols or vice versa, transmitting signals through a complex wireless network, etc. Additionally, filters, such as anti-aliasing filters within the transmitters and I/O marshalling devices may have dead times associated therewith (in addition to time constants). Thus, the time constants $\tau_{i0}$ may come from real process dynamics, the operation of valves and actuators in the process, the operation of filters in the I/O network devices, etc. Likewise the dead time terms $\theta_i$ may come from real process dead time, dead times introduced by the operation of valves, actuators, filters, I/O marshalling devices, communication networks, etc. within the process control I/O network. Additionally, the scan rate terms $\rho_i$ may come from I/O network device scan rates, the digital controller scan or update rate, transmitter scan rates, I/O marshalling device scan rates, etc.

It will also be noted that, according to equation (1), the second order time constant of the process approximation $\tau_2$ includes the second largest time constant of the entire loop ($\tau_{20}$) plus one half of the third largest time constant of the entire loop ($\tau_{30}$) which give rise to the so-called "half-rule" aspect of this process approximation. Moreover, it will be noted that the process dead time is a summation of the dead times of each of the components in the I/O network plus a summation of one half of the third largest time constant and all of the other higher order time constants, and a summation of the scan rates of each of the different devices in the process control loop.

Unlike the original Skogestad paper, the calculations above incorporate the time constants of each of the filters (e.g., the anti-aliasing and low pass filters) used in each of the scanning and other input/output devices, as well as other time constants associated with these devices, into both of the second order time constant calculations ($t_1$ and $t_2$) as well as into the estimated process dead time Od calculation. Additionally, the dead times and scan rates of multiple ones of the various devices in the I/O network are considered in or are accounted for the process dead time approximation. The original Skogestad paper did not account for multiple scan rates and dead times of different devices, and did not account for time constants of or associated with or introduced by input/output devices within a process loop or an input/output network of a process loop. Importantly, however, the tuning method described herein accounts for the fact that the time constants, dead times and scan rates of the I/O network components can also be important to tuning the system, as a whole, as any of these time constants may be dominant or may negatively affect the process control dynamics. In fact, in this equation, one or more of the input/output communication network device time constants may show up in the first or second order components of the process approximation. That is, the anti-aliasing or low pass filter time constants used in the I/O communication network of the process control loop may be the $\tau_{10}$ or $\tau_{20}$ or $\tau_{30}$ factors (i.e., the highest time constants within the process control loop). Still further, the dead times and scan rates of the various input/output devices and time delays associated with these devices are included in the $\rho_i$ calculations and thus affect or contribute to the dead time estimation in the process approximation. These factors were not present or considered in this manner in the original Skogestad paper. The tuning method described herein thus provides for a more accurate and better process approximation that works well to enable proper tuning when the input/output network devices have significant negative effects on the feedback loop, such as when anti-aliasing filters are used, when aliasing is present, when input/output devices have relatively low or slow scan rates, when wireless communications are used that introduce time delays, etc.

After the process has been approximated, the system or method may then determine the PID controller tuning factors using, for example, a Lambda tuning method. While there are many different approaches to controller tuning, Lambda ($\lambda$) tuning is preferable in this instance because it addresses both simple and complex process dynamics, and is among the easiest to understand and implement. With Lambda tuning for a self-regulating process, the "lambda" is the closed loop first order time constant of a step set point change of the control loop. Lambda tuning allows the characterization of the closed loop behavior with a single number $\lambda$, which is also called the closed loop time constant. The total dead time of the loop (process, measurement and final control element) limits the control performance of a loop. Choosing the lambda as a factor times the dead time provides a consistent tuning method that reveals the negative impact of increased dead time on the potential control performance of the loop.

In one example, for a self-regulating process, the controller may be tuned so that the closed loop transfer function for a set point change response is that of a low pass first order filter with a time constant of $\lambda$:

$$\frac{PV}{SP} = \frac{1}{\lambda s + 1} \qquad (2)$$

The closed loop transfer function for load disturbance rejection may be set to be that of a high pass first order filter with a time constant of $\lambda$:

$$\frac{PV}{L} = \frac{\lambda s}{\lambda s + 1} \qquad (3)$$

One of the many advantages of Lambda tuning is that it allows the closed loop performance to be specified easily by setting the value of k. In addition, the method can be used to coordinate the response of related control loops and to minimize loop interaction.

In any event, for a second order process plus time delay model or process approximation as provided in equation (1), the lambda tuning equations for the standard form of the PID are the same for both the load rejection and the set point response, and are as follows:

$$K_c = \frac{1}{K_p} \frac{\tau_1 + \tau_2}{\lambda + \theta_d} \quad (4)$$

$$\tau_r = \tau_1 + \tau_2 \quad (5)$$

$$\tau_d = \frac{\tau_1 \tau_2}{\tau_1 + \tau_2} \quad (6)$$

Here: $K_c$ is the controller gain of the proportional controller component, $\tau_r$ is the reset time constant of the integral controller component and $\tau_d$ is the rate time constant of the derivative controller component.

The Lambda tuning procedure is thus fairly straightforward. First, the system or method determines the process gain ($K_p$), dead time ($\theta_d$) and time constants ($\tau_1$, $\tau_2$) using standard procedures (for the process gain $K_p$) and equation (1) for the time constants ($\tau_1$, $\tau_2$) and the dead time ($\theta_d$). Then, the system or method calculates the controller reset and rate ($\tau_r$, $\tau_d$), i.e., the tuning factors for the integral (I) and derivative (D) controller components using equations (5) and (6). Then, the system or method determines a value of Lambda (k), and the controller gain ($K_c$) is calculated using equation (4).

In practice, forgoing a need to coordinate loop responses or to minimize interaction, the system or method may use the following initial selection of lambda to ensure robustness:

$$\kappa = 3 \max(\tau_r, \theta_d) \quad (7)$$

In other words, in this case, lambda ($\lambda$) may be chosen to be three times the larger of the estimated process dead time or the reset time constant.

Thereafter, the system or method provides the controller tuning parameters $K_c$, $\tau_r$, $\tau_d$ to the PID controller and the PID controller uses these tuning parameters for control calculations.

As discussed previously, time delays compromise the stability of digital control systems. The enhanced PID design and tuning strategy described herein adds those delays $\theta_i$ directly to the dead time approximation term $\theta_d$. It will be seen then that, more delays in the process control system loop lead to a larger $\theta_d$, and thus to a more conservative setting of controller gain IQ, which is necessary to guarantee a satisfactory control performance based on equation (4). Moreover, incorporating the modified "half rule" process approximation as described herein, the enhanced PID design and tuning method simplifies the process dynamics and uses a second-order-plus-time-delay transfer function as a replacement. The resulting simplification not only demonstrates how to approximate various process dynamics easily (like flow change, valve motion, filters, etc.), but also lays the foundation of the PID controller design by providing for a more simple tuning methodology.

Thus, the new and enhanced PID controller design and tuning method described herein provides a systematic tool for obtaining performance improvement of PID controllers within a process control system. Such a method and system can overcome challenges arising from signal aliasing and anti-aliasing filtering, and from the different configurations and settings of both traditional and expanded or enhanced input/output networks. In addition, this method and system may be used for different types of processes, for processes with different sampling rates, for systems with variations in time delays (jitter), and for processes that have aliasing within the control performance.

Figure 4:
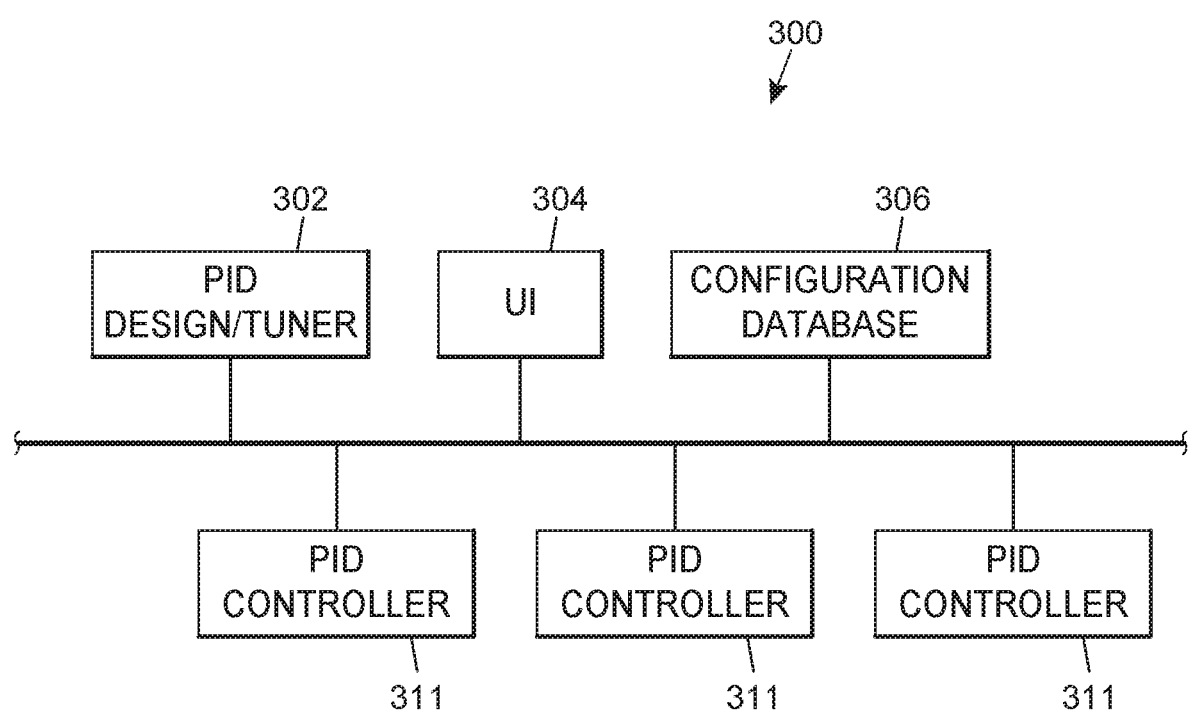
FIG. 4 depicts a block diagram of a PID controller design and/or tuning system that can be used to implement an enhanced PID controller design or tuning procedure within the process control system of FIG. 1.

FIG. 4 illustrates an example PID controller design or tuning system that may be used to implement the controller design or tuning method described herein. In particular FIG. 4 depicts a configuration system 300 that includes a PID process controller design or tuning application 302 communicatively coupled to one or more user interfaces 304 and to a configuration database 306. Additionally, the application 302 may be connected to one or more process controllers 311 which may be, for example, PID process controllers or control modules used to control one or more process loops in a process plant. If desired, the application 302 may be stored in a memory of and may be executed on a processor of a computer, e.g., a workstation or other configuration device 13 of for example, FIG. 1. Additionally, the user interface devices 304 may be interface devices associated with a process plant configuration system or operator system such as the interface devices 14 of FIG. 1. In this case, the application 302 may be part of a plant design or configuration system in which one or more PID process controllers are being designed or implemented in a plant, or may be part of a plant operation and control system, in which case the application 302 may be used or called to perform tuning on one or more PID controllers that is currently running within a process plant. Additionally, the configuration database 306, which may be the configuration database 12B of FIG. 1, may store information about the configuration of the process plant, and in particular, the devices and logical elements (e.g., control routines, control loops, etc.) within a process plant. The configuration database 306 may store information indicating the identity of, capabilities of, make up of and configuration of various devices in one or more process control loops being controlled by one or more PID control routines or control modules. Thus, the configuration database 306 may store information pertaining to the identity of and make up of various anti-aliasing filters used in various transmitters and input/output devices, whether those filters are currently in use in the plant, etc. Still further, the configuration database 306 may store information indicating the manner in which various field devices (e.g., valves, transmitters, etc.) are connected to a process controller in a process control loop, including the input/output devices used to make the connections, the A/D converters in those devices, the scan rates of those devices, transport delays associated with those devices, and any other information indicating time delays or noise or jitter that may be introduced by those devices and any time constants associated with the operation of those devices. Likewise, the configuration database 306 may store information pertaining to the process controllers used in the PID process control loops within the plant, the scan rates of those controllers or control modules, etc. The configuration database 306 may also store information about the dynamics of the process being controlled, including various process time constants and dead times and process gains for different control loops of the process.

As illustrated in FIG. 4, the application 302 may be connected to one or more process controllers 311 and may communicate with these controllers 311 to obtain information from these controllers or from field devices and input/output devices connected to these controllers to obtain information from those devices or to send information or commands to those devices.

The design and tuning application 302 may have subroutines, modules or components that perform various operations associated with a PID controller design or tuning procedure as described herein. The application 302 may, for example, include one or more routines or modules or components that obtain or determine information pertaining to, about or describing the process (e.g., process time constants, dead time(s)), that obtain or determine information pertaining to, about or describing the PID controller (e.g., the identity of the PID controller being designed or tuned, the process loop and process equipment being used to control the process by the PID controller, the update or scan rate of the PID controller, etc.) and that obtain or determine information pertaining to, about or describing the devices in the I/O network of the process loop being controlled (e.g., scan rates, dead times or delays of these devices, time constants associated with filters, valves, actuators, etc. in the loop, etc.) These routines may obtain or determine this information by enabling the user to input this information via a user interface, from the configuration database, or from the various devices themselves. The application 302 may also include sub-routines, modules or components that then estimate the process control loop as a whole, including using parameters or variables describing the operation of the process, the PID controller, and the devices in the I/O network used in the process control loop to estimate the entire process control loop as a second order plus dead time estimated process. The application 302 may have one or more sub-routines, modules or components that then perform a tuning method using the estimated process variables, such as modules that implement a Lambda tuning method to determine optimal tuning parameters for a PID controller based on the estimated process (that incorporates elements from the PID controller, the process and the I/O network used in the process control loop). These routines or modules may enable a user to select a tuning method, or to select a value for the lambda in a Lambda tuning method, or the routines may automatically select or calculate a value for the lambda using a preset value or methodology. Additionally, the application 302 may include one or more routines that estimate the operation of the process control loop based on the calculated tuning parameters and that show or display this operation to a user to allow the user to see the characteristics of the designed and tuned controller, and to change the tuning parameters or methodology if desired. Also, the application 302 may include one or more routines that then download or send the calculated tuning parameters to the PID controller for use by the PID controller in performing control during operation of the process.

Thus, during operation, the application 302 may be initiated to implement a PID controller design, such as when configuring a process plant or adding a new control loop to a process plant, or may be initiated to tune an already designed and installed PID controller, such as when a process control loop being controlled by a PID control module of a controller is not performing well. In either case, the application 302 may request the identity of the control module or PID controller to be designed or tuned and, upon receiving that information, may communicate with the configuration database 306, with a user via a user interface 304 or with the process controller 311 that stores and implements the identified PID control module to obtain information about the PID controller and control loop, including the scan rate or execution rate of the PID control module, the connections or process variables being controlled by the PID control module, the devices within the input/output network that makes up the process control loop being used and controlled by the PID control module, etc. Of course, if desired, the application 302 may obtain this information from the user directly via user input at one of the user input devices 304, from the configuration database 306, from one of the controllers 311 or any combination of these devices.

Upon receiving information about the PID process control module being created or tuned and determining the devices (and I/O network) within the process control loop associated with the process module, the application 302 may obtain specific information identifying each of the devices in the loop and each of the pertinent characteristics of each of the devices, including scan rates of the devices, filter makeup or coefficients of the devices or components of the devices (e.g., A/D converters within the devices), whether anti-aliasing filters are engage or not and the make-up or configuration of these filters. In one case the application 302 may systematically and automatically obtain this information from the configuration database 306 or from the process controllers 311, or may prompt a user via one of the user interfaces 304 for this information (if for example, this information that is not available in the configuration database 306 or from the controllers 311).

Figure 5:
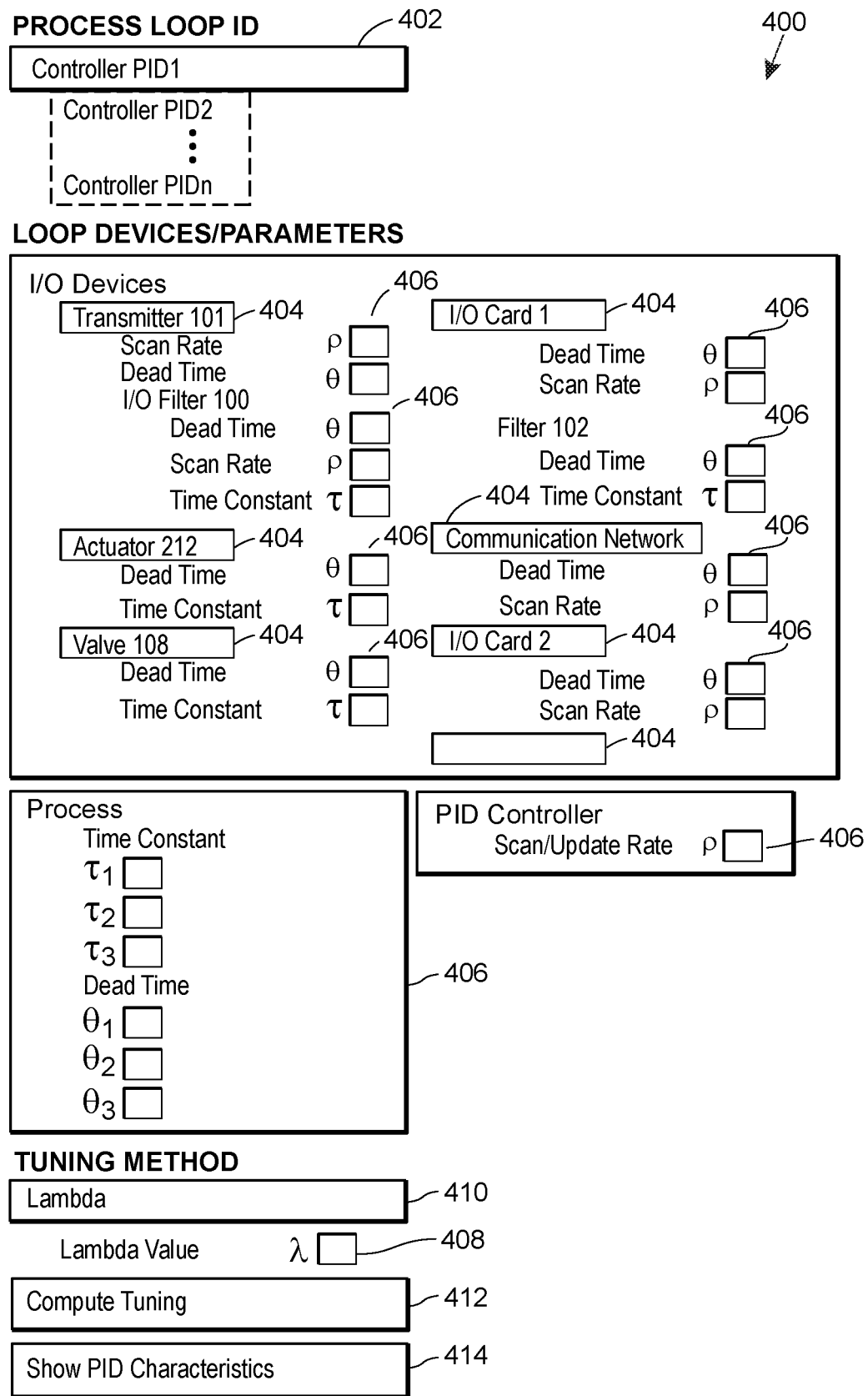
FIG. 5 depicts an example user interface that may be implemented by the PID controller design or tuning system of FIG. 4.

FIG. 5 illustrates an example, screen display 400 that may be provided by the application 302 to request the user to supply an identification of the process module or process control loop being designed or tuned (which may be provided or selected via drop down menu at an input box 402 if desired). When a particular PID controller or loop is selected, the system may display various devices or components within the selected control loop (at the input boxes 404) and enable the user to change those devices, add new devices in the loop, etc. These devices or components may include a specification of the process component, the various I/O device components and the PID controller component. For each of the specified components, the system may obtain and display the various time delays, time constants, filter properties, scan rates, dead times, etc. of the identified devices or components in a process control loop being designed or tuned at the input boxes 406. As noted above, some or all of the input information may be obtained automatically by the application 302 from the configuration database 306 or from one of the process controllers 311 (or from the input/output and field devices connected to the process controllers 311 or even from the field devices themselves), or via direct input from the user in the input boxes 402, 404 and 406. The application 302 may also provide the user with drop down boxes or pop-up boxes indicating various choices the user may have for each of these elements, and these choices may, for example, be obtained from device information within the configuration database 306 or the process controllers 311 or the input/output devices, or the field devices.

Once the application 302 obtains information related to each of the devices in the process control loop being designed or tuned, the application 302 may approximate the process using the half-rule second order plus dead time approximation of equation (1). Here, the application 302 may determine the most dominant time constants $t_{10}$ and $t_{20}$ for use in these equations from the information about the process control loop being designed or tuned, including the filters and scan properties of the input/output devices, the process, and the process controller, within the loop. Likewise, the application 302 may determine the dead time of the approximated process using all of the scan and execution rates of the various devices with the process control loop being created or tuned and the higher order time constants.

Moreover, prior or after executing the estimated process loop calculation, i.e., approximating the process loop using equation (1), the application 302 may request the user to select a particular tuning or controller design method to be used to determine the PID controller design or tuning parameters. A choice of a tuning method may be provided by the input box 410 of FIG. 5. In some cases, the application 302 may simply use a Lambda tuning methodology as described above, but in other cases may provide the user with other tuning options or methods that can be used based on the process approximation (e.g., via a drop down or pop up box in FIG. 5). If the application 302 uses or the user selects a Lambda tuning method, the application 302 may request the user to specify the value of lambda in the box 408 or, alternatively, may calculate a value of Lambda using, for example, equation (7) above. In any event, upon the user pressing the compute tuning button 412, the application 302 may calculate the PID controller design or tuning parameters including the controller gain $K_c$, and the reset time constant $\tau_r$, and the rate time constant $\tau_d$, using equations (4)-(6) above. The application 302 may model or display the PID controller characteristics (in a separate set of graphs or lists), if the user selects the display characteristics button 414. Moreover, the application 302 may provide these design or tuning parameters to the PID control module within the process controller 311 that implements the PID control loop (upon authorization by the user to do so, for example). The application 302 may then repeat these steps for other (e.g., all of the other) PID control modules or loops within the process plant or within a portion of the process plant.

If desired, the application 302 may model or estimate the process control characteristics of the designed or tuned process loop and may provide these estimates to a user (via the user interface 400) after, for example, the user presses or selects the display characteristics button 414 in FIG. 5. These process control characteristics may be provided as factors and/or as one or more graphs to enable the user to view the control response of the tuned PID controller to, for example, set point changes and/or load disturbances. The user may then change the lambda used in the calculations if so desired, and the application 302 can retune the tuning calculations and process loop estimations based on the new value of lambda. Additionally or alternatively, the user could change devices or device features of the I/O devices used in the I/O network by specifying, via for example, the screen 400 of FIG. 5, new or different devices or device features in the I/O network and the dead times, scan rates and time constants of those new or different devices or device features. The tuning or design system may then compute a new process control loop approximation, perform tuning on that new process control loop approximation, and then execute or run models (i.e., to model the operation of the newly designed control loop) and illustrate the process control characteristics with the this new or different process I/O loop via, for example, graphs or charts. For example, a user could use the screen 400 of FIG. 5 to change filter settings, switch filters in various I/O device on or off, change I/O devices (or types of I/O devices, e.g., from using a 4-20 ma device to an smart device that does not include the use of A/D converters, etc.), add or eliminate the use of various anti-aliasing filters or other device characteristics, change dead times, scan rates, etc. of devices to determine if the newly designed process control loop would perform better than the current design. In this manner, the user can view how changing devices, device components, and filter settings will impact control.

The application 302 thus provides and implements a consistent and easy to use methodology for designing or tuning PID control loops or modules within a process plant that provides for better or more optimum control, as this method takes into account a wider array of the factors that currently affect process control loop performance in complex process control systems that use various different types of devices and filters in the loop input/output networks.

The term "field device" is used herein in a broad sense to include a number of devices or combinations of devices (i.e., devices providing multiple functions, such as a transmitter/ actuator hybrid), as well as any other device(s) that perform(s) a function in a control system. In any event, field devices may include, for example, input devices (e.g., devices such as sensors and instruments that provide status, measurement or other signals that are indicative of process control parameters such as, for example, temperature, pressure, flow rate, etc.), as well as control operators or actuators that perform actions in response to commands received from controllers and/or other field devices.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A method of tuning a proportional-integral-derivative (PID) process controller for use in controlling a process when the PID process controller is connected to the process via an input/output network, the PID process controller, the input/output network and the process forming a process loop, the method comprising:

determining one or more characteristics of the PID process controller, including determining an execution rate of the PID process controller;

determining one or more characteristics of the process, including determining a plurality of time constants of the process and a plurality of process dead times of the process;

determining one or more characteristics of one or more devices within the input/output network of the process loop, including determining at least one of one or more input/output device scan rates and one or more input/ output time constants associated with the one or more devices within the input/output network of the process loop and one or more input/output dead times associated with the one or more devices within the input/ output network;

estimating the process control loop as a second order plus dead time estimated process, including determining first and second order time constants of the estimated process as a function of the plurality of process time constants and the one or more input/output time constants and determining the dead time of the estimated process as a function of the plurality of dead times of the process, a summation of the plurality of process time constants, the one or more input/output time constants, the one or more input/output device scan rates, the execution rate of the PID process controller and the one or more input/output dead times;

determining a set of PID process controller tuning factors from the estimated process time constants and the estimated process dead time; and tuning the PID controller using the determined set of PID process controller tuning factors.

2. The method of tuning a PID process controller of claim 1, wherein the PID process controller tuning factors include a controller gain, a reset time constant and a rate time constant.

3. The method of tuning a PID process controller of claim 1, wherein determining the set of PID process controller tuning factors from the estimated process time constants and the estimated process dead time includes using a Lambda tuning method.

4. The method of tuning a PID process controller of claim 3, wherein using a Lambda tuning method includes enabling a user to select the value of lambda in the Lambda tuning method.

5. The method of tuning a PID process controller of claim 3, wherein using a Lambda tuning method includes automatically selecting the value of lambda in the Lambda tuning method.

6. The method of tuning a PID process controller of claim 3, wherein using a Lambda tuning method includes using the value of lambda in the Lambda tuning method as a factor times the maximum of a reset time constant tuning factor and the estimated process dead time.

7. The method of tuning a PID process controller of claim 6, wherein the factor is three.

8. The method of tuning a PID process controller of claim 1, wherein determining one or more characteristics of the PID process controller includes enabling a user to input the one or more characteristics of the PID process controller.

9. The method of tuning a PID process controller of claim 1, wherein determining one or more characteristics of the PID process controller includes obtaining the one or more characteristics of the PID process controller from a configuration database.

10. The method of tuning a PID process controller of claim 1, wherein determining one or more characteristics of one or more devices within the input/output network of the process loop includes enabling a user to input the one or more characteristics of the one or more devices within the input/output network.

11. The method of tuning a PID process controller of claim 1, wherein determining one or more characteristics of one or more devices within the input/output network of the process loop includes determining the one or more characteristics of the one or more devices within the input/output network from a configuration database.

12. The method of tuning a PID process controller of claim 1, wherein determining one or more characteristics of one or more devices within the input/output network of the process loop includes determining the one or more characteristics of the one or more devices within the input/output network from the one or more devices within the input/output network.

13. The method of tuning a PID process controller of claim 1, wherein determining one or more characteristics of one or more devices within the input/output network of the process loop includes determining one or more input/output time constants associated with one or more filters within the one or more devices within the input/output network of the process loop.

14. The method of tuning a PID process controller of claim 1, wherein determining one or more characteristics of one or more devices within the input/output network of the process loop includes determining one or more input/output time constants associated with one or more actuators within the input/output network of the process loop.

15. The method of tuning a PID process controller of claim 1, wherein determining one or more characteristics of one or more devices within the input/output network of the process loop includes determining one or more input/output time constants associated with one or more valves within the input/output network of the process loop.

16. The method of tuning a PID process controller of claim 1, wherein determining one or more characteristics of one or more devices within the input/output network of the process loop includes determining one or more input/output dead times associated with one or more actuators within the input/output network of the process loop.

17. The method of tuning a PID process controller of claim 1, wherein determining one or more characteristics of one or more devices within the input/output network of the process loop includes determining one or more input/output dead times associated with one or more communication networks within the input/output network of the process loop.

18. The method of tuning a PID process controller of claim 1, wherein determining one or more characteristics of one or more devices within the input/output network of the process loop includes determining one or more input/output dead times associated with one or more input/output marshalling devices within the input/output network of the process loop.

19. The method of tuning a PID process controller of claim 1, wherein determining one or more characteristics of one or more devices within the input/output network of the process loop includes determining one or more input/output dead times associated with one or more filters within the input/output network of the process loop.

20. The method of tuning a PID process controller of claim 1, further including modeling the operation of the PID controller in the process loop using the PID tuning parameters to determine one or more process control characteristics of the process loop and providing the one or more process control characteristics to a user.

21. The method of tuning a PID process controller of claim 20, further including enabling a user to change one or more of the devices within the input/output network of the process loop to change one or more of the characteristics of one or more devices within the input/output network of the process loop to form a changed process loop, estimating the changed process loop as a second order plus dead time estimated process, determining a new set of PID process controller tuning factors for the changed process loop, modeling the operation of the PID process controller in the changed process loop using the new PID tuning parameters to determine one or more new process control characteristics of the new process loop and providing the one or more new process control characteristics to a user.

22. A system for tuning a proportional-integral-derivative (PID) process controller for use in controlling a process when the PID process controller is connected to the process via an input/output network, the PID process controller, the input/output network and the process forming a process loop, comprising:
- a first computer implemented software component that determines, via a computer processor, one or more characteristics of the PID process controller, including an execution rate of the PID process controller;
- a second computer implemented software component that determines, via a computer processor, one or more characteristics of the process, including determining a plurality of time constants of the process and a plurality of dead times of the process;
- a third computer implemented software component that determines, via a computer processor, one or more characteristics of one or more devices within the input/output network of the process loop, including determining at least one of one or more input/output device scan rates and one or more input/output time constants and one or more input/output dead times associated with the one or more devices within the input/output network of the process loop;
- a fourth computer implemented software component that calculates, via a computer processor, an estimate of the process loop, by determining first and second order time constants of the estimated process loop as a function of the plurality of process time constants and the one or more input/output time constants and by determining a dead time of the estimated process loop as a function of a summation of the plurality of process time constants and the one or more input/output time constants and the one or more input/output device scan rates and the execution rate of the PID process controller and the one or more input/output dead times and the plurality of process dead times;
- a fifth computer implemented software component that determines, via a computer processor, a set of PID process controller tuning factors from the estimated process loop time constants and the estimated process loop dead time; and
- a sixth computer implemented software component that provides the PID controller with the determined set of PID process controller tuning factors for use by the PID controller during operation of a process.

23. The system for tuning a PID process controller of claim 22, wherein the fifth computer implemented software component determines the PID process controller tuning factors as a controller gain, a reset time constant and a rate time constant.

24. The system for tuning a PID process controller of claim 22, wherein the fifth computer implemented software component determines the set of PID process controller tuning factors from the estimated process time constants and the estimated process dead time using a Lambda tuning method.

25. The system for tuning a PID process controller of claim 24, wherein the fifth computer implemented software component enables a user to select the value of lambda in the Lambda tuning method.

26. The system for tuning a PID process controller of claim 24, wherein the fifth computer implemented software component uses a preset value of lambda in the Lambda tuning method.

27. The system for tuning a PID process controller of claim 24, wherein the fifth computer implemented software component uses a value of lambda in the Lambda tuning method as a factor times the maximum of a reset time constant tuning factor and the estimated process loop dead time.

28. The system for tuning a PID process controller of claim 22, wherein the first computer implemented software component determines one or more characteristics of the PID process controller by enabling a user to input the one or more characteristics of the PID process controller.

29. The system for tuning a PID process controller of claim 22, wherein the third computer implemented software component determines one or more characteristics of one or more devices within the input/output network of the process loop by enabling a user to input the one or more characteristics of the one or more devices within the input/output network.

30. The system for tuning a PID process controller of claim 22, wherein the third computer implemented software component determines one or more characteristics of one or more devices within the input/output network of the process loop from a configuration database.

31. The system for tuning a PID process controller of claim 22, wherein the third computer implemented software component determines one or more characteristics of one or more devices within the input/output network of the process loop from the one or more devices within the input/output network.

32. The system for tuning a PID process controller of claim 22, further including a seventh computer implemented software component that models the operation of the PID controller in the process loop using the PID process controller tuning parameters to determine one or more process control characteristics of the process loop and provides the one or more process control characteristics to a user.

33. The system for tuning a PID process controller of claim 32, wherein the third computer implemented software component enables a user to change one or more of the devices within the input/output network of the process loop to change one or more of the characteristics of one or more devices within the input/output network of the process loop to form a changed process loop, wherein the fourth computer implemented software component estimates the changed process loop as a second order plus dead time estimated process, wherein the fifth computer implemented software component determines a new set of PID process controller tuning factors for the changed process loop, and the seventh computer implemented software component models the operation of the PID process controller in the changed process loop using the new PID tuning parameters to determine one or more new process control characteristics of the new process loop and provides the one or more new process control characteristics to a user.

34. The system for tuning a PID process controller of claim 22, wherein the third computer implemented software component determines the one or more characteristics of one or more devices within the input/output network of the process loop by determining one or more input/output time constants associated with one or more filters used within the one or more devices within the input/output network of the process loop.

35. A process control system for controlling a portion of a process using a process control loop, comprising:
- a proportional-integral-derivative (PID) process controller;
- a plurality of input/output communication devices connected between the PID process controller and the process to measure one or more process variables and to communicate the measured process variables to the PID process controller and to send one or more control signals from the PID process controller to a controlled device in the process; and a process controller tuner, including;
  a processor,
  a process controller tuning routine stored on a memory and adapted to be executed on the processor to,
  (1) estimate the process control loop as a second order plus dead time process by;
    (a) determining first and second order time constants of the estimated process control loop as a function of a plurality of process time constants associated with the operation of the process and one or more input/output time constants associated with the operation of one or more of the input/output communication devices, and
    (b) determining the dead time of the estimated process control loop as a function of a summation of the plurality of process time constants and the one or more input/output time constants and one or more input/output device scan rates and the execution rate of the PID process controller and a plurality of process dead times and one or more input/output device dead times associated with one or more of the input/output devices; and
  (2) determine a set of PID process controller tuning factors from the first and second estimated process control loop time constants and the estimated process control loop dead time.

36. The process control system of claim 35, wherein the process controller tuning routine determines the controller tuning factors as a controller gain, a reset time constant and a rate time constant.

37. The process control system of claim 35, wherein the process controller tuning routine determines the set of PID process controller tuning factors from the first and second estimated process control loop time constants and the estimated process control loop dead time using a Lambda tuning method.

38. The process control system of claim 37, wherein the process controller tuning routine enables a user to select the value of lambda in the Lambda tuning method.

39. The process control system of claim 37, wherein the process controller tuning routine uses a preset value of lambda in the Lambda tuning method.

40. The process control system of claim 37, wherein the process controller tuning routine calculates the value of lambda in the Lambda tuning method as a factor times the maximum of a reset time constant tuning factor and the estimated process control loop dead time.

41. The process control system of claim 35, wherein the process controller tuning routine determines at least one of the one or more input/output time constants associated with the operation of one or more of the input/output devices based on the characteristics of a filter within one of the one or more input/output devices.

42. The process control system of claim 35, wherein the process controller tuning routine determines at least one of the one or more input/output time constants associated with the operation of one or more of the input/output devices based on the characteristics of an analog to digital converter within one of the one or more input/output devices.

43. The process control system of claim 35, wherein the process controller tuning routine determines at least one of the one or more input/output scan rates associated with the operation of one or more of the input/output devices based on a sampling rate of a measurement device within the process control loop.

44. The process control system of claim 35, wherein the process controller tuning routine determines at least one of the one or more input/output scan rates associated with the operation of one or more of the input/output devices based on an update rate of an input/output signal marshalling device within the process control loop.

45. The process control system of claim 35, wherein the process controller tuning routine further models the operation of the PID process controller in the process control loop using the PID process controller tuning parameters to determine one or more process control characteristics of the process control loop and providing the one or more process control characteristics to a user.

46. The process control system of claim 35, wherein the process controller tuning routine further enables a user to change one or more of the input/output communication devices of the process control loop to change one or more of the characteristics of one or more of the input/output communication devices to form a changed process control loop, estimates the changed process control loop as a second order plus dead time estimated process, determines a new set of PID process controller tuning factors for the changed process control loop, models the operation of the PID process controller in the changed process control loop using the new PID tuning parameters to determine one or more new process control characteristics of the new process control loop and provides the one or more new process control characteristics to a user.

* * * * *